United States Patent [19]

Weibel

[11] Patent Number: 4,831,127
[45] Date of Patent: May 16, 1989

[54] PARENCHYMAL CELL CELLULOSE AND RELATED MATERIALS

[75] Inventor: Michael K. Weibel, West Redding, Conn.

[73] Assignee: SBP, Inc., Philadelphia, Pa.

[21] Appl. No.: 512,940

[22] Filed: Jul. 12, 1983

[51] Int. Cl.[4] ................................................ C08B 1/00
[52] U.S. Cl. ........................................ 536/56; 127/37; 536/128; 106/163.1
[58] Field of Search ...................... 536/56, 128; 127/37

[56] References Cited

U.S. PATENT DOCUMENTS

| | | | |
|---|---|---|---|
| 2,709,699 | 5/1955 | Wolf et al. | 536/56 |
| 2,803,567 | 8/1957 | Owens et al. | 127/34 |
| 2,862,814 | 12/1958 | Birdseye | 92/6 |
| 2,978,446 | 4/1961 | Battista et al. | 536/56 |
| 3,141,875 | 7/1964 | Battista et al. | 536/56 |
| 3,212,932 | 10/1965 | Hess et al. | 127/37 |
| 3,479,248 | 11/1969 | Nobile | 127/37 |
| 4,018,620 | 4/1977 | Penque | 127/37 |
| 4,023,982 | 5/1977 | Knauth | 127/1 |
| 4,025,356 | 5/1977 | Nyman et al. | 127/1 |
| 4,029,515 | 6/1977 | Kiminiki et al. | 127/37 |
| 4,070,232 | 1/1978 | Funk | 162/16 |
| 4,160,695 | 7/1979 | Dietrichs et al. | 435/101 |
| 4,168,988 | 9/1979 | Riehm et al. | 127/37 |
| 4,174,976 | 11/1979 | Tsao et al. | 127/37 |
| 4,201,596 | 5/1980 | Church et al. | 127/37 |
| 4,226,982 | 10/1980 | Blount | 521/125 |
| 4,237,226 | 12/1980 | Grethlein | 435/99 |
| 4,239,906 | 12/1980 | Antrim et al. | 536/56 |
| 4,241,093 | 12/1980 | Farag et al. | 426/258 |
| 4,266,981 | 5/1981 | Tsao et al. | 127/37 |
| 4,269,859 | 5/1981 | Morse | 536/56 |
| 4,281,063 | 7/1981 | Tsao et al. | 435/99 |
| 4,307,121 | 12/1981 | Thompson | 426/431 |
| 4,321,360 | 3/1982 | Blount | 536/128 |
| 4,341,807 | 7/1982 | Turbak et al. | 426/570 |
| 4,352,770 | 10/1982 | Turbak et al. | 426/570 |
| 4,378,381 | 3/1983 | Turbak et al. | 426/570 |
| 4,391,973 | 7/1983 | Cruz | 536/56 |
| 4,395,543 | 7/1983 | Wang et al. | 127/37 |
| 4,432,805 | 2/1984 | Nuuttila et al. | 127/37 |
| 4,438,263 | 3/1984 | Morse | 536/56 |

FOREIGN PATENT DOCUMENTS 555842 10/1942 United Kingdom .
2066145A 7/1981 United Kingdom .

OTHER PUBLICATIONS

Webster's Third New International Dictionary, G. & C. Merriam Company, Springfield, Mass., U.S.A. 1966, p. 1641.
L. Loeb et al., "Preparation of Cotton Cellulose IV from Cotton Cellulose III:", J. of Polymer Science, vol. XIV, Issue No. 73 (1954), pp. 121–123.
E. Yanovsky, "Extraction of Hemicelluloses from Plant Materials", Industrial & Engineering Chemistry, Jan. 1939, pp. 95–100.
Miller et al., "Bt-Products from Sugar Beets", Chemurgic Digest, Apr. 1948 pp. 21–24.
H. Mamers et al: "Explosion Pulping of Bagasse and Wheat Straw", pp. 93–96, Tappi Journal of the Technical Assoc. of the Pulp and Paper Industry, vol. 64 No. 7, Jul. 1981 Atlanta, Georgia, U.S.A.
Journal of Food Science, vol. 45 No. 4 Jul./Aug. 1980, pp. 985–998, Chicago, Illinois U.S.A., L. L. Eaks et al: "Cellulose–Hemicellulose Fractions in the Alcohol–Insoluble Solids of Valencia Orange Peel".

Primary Examiner—Ronald W. Griffin
Attorney, Agent, or Firm—Woodcock Washburn Kurtz Mackiewicz & Norris

[57] ABSTRACT

Methods for the isolation of certain biologically important polymers from parenchymal cell-containing plant materials, especially sugar beet and citrus pulp, are disclosed. Hydrolysis under extremes of pH and under elevated temperatures for short reaction periods with physical shearing are disclosed which lead to the isolation of hemicellulosic and cellulosic components of such plant materials without substantial degradation thereof. Novel cellulosic products and vegetable gums are provided having unique physical, chemical and rheological properties.

89 Claims, No Drawings

PARENCHYMAL CELL CELLULOSE AND RELATED MATERIALS

BACKGROUND OF THE INVENTION

The present invention relates to methods for the isolation of biological polymers from plant material comprising parenchymal cells, especially from sugar beet, citrus and related pulps. More particularly, this invention deals with the isolation of cellulose from sugar beet and citrus pulp and other materials, which cellulose is found to have unique structural, chemical, physical and rheological properties. This invention is also concerned with the isolation of non-cellulosic biopolymers, including hemicelluloses, from such materials, and with the production of novel vegetable gums. This invention is further directed to the simultaneous, economical isolation and recovery of cellulosic and noncellulosic biopolymers from parenchymal cell-containing material, especially sugar beet and citrus pulp.

Spent sugar beet pulp, a by-product of the sugar beet processing industry, is comprised predominantly of three biopolymers, pectin, arabinogalactan and cellulose. Other naturally occurring biological constituents of sugar beets such as fats, proteins, soluble oligosaccharides, and other low molecular weight components, are largely extracted from sugar beets during the removal of sucrose therefrom. The remaining polysaccharides in sugar beet pulp comprise generally conjugated, particulate cell residuals having morphologies generally characteristic of parenchymal cells found in certain higher plants.

Typically, the solid composition of sugar beet pulp comprises about 40% cellulose, about 30% arabinogalactan, and about 30% pectin. Minor amounts of protein, tannins and residual, low molecular weight carbohydrates are also generally present. The gross composition varies slightly with species, growing conditions and time of harvest. Historically, few economical uses have been found for spent sugar beet pulp. It is a material which spoils rapidly and consequently constitutes a local environmental problem. In contrast to the solid residue obtained from the processing of sugar cane, sugar beet pulp has a negative fuel value. Accordingly, it takes more energy to dehydrate sugar beet pulp to a combustible state than can be recovered from its burning. Sugar beet pulp has been admixed with molasses and dried for use as ruminate feed, however, alternative markets for molasses have largely led to the discontinuation of its addition to pulp. The low intrinsic nitrogen content of molasses-free pulp reduces its feed value to simple roughage. Moreover, the energy costs attendant to the drying of sugar beet pulp render the resulting material so expensive that it is becoming uncompetitive even as a feed extender. Similar considerations apply to raw citrus pulp which cannot be dried efficiently and which, accordingly, is almost always limed to facilitate mechanical dewatering.

From time to time, it has been proposed to extract certain of the hemicellulosic components of sugar beet, citrus and other pulp for commercial use. Thus, the hydrolysis of sugar beet pulp in either acidic or basic conditions together with the isolation and hydrolytic modification of hemicelluloses, especially pectin, therefrom has been reported. In all cases where high thermal and/or acid or base assisted extractions were performed upon sugar beet pulp, it was perceived that increasing temperature and acid or base strength led to undesirable hydrolytic degradation of the arabinogalactan and/or pectin components of the pulp. The prior art has, accordingly, indicated the inadvisability of the use of high temperatures and strongly acidic or basic conditions for the hydrolytic processing of sugar beet pulp to obtain hemicelluloses.

The cellulosic components of sugar beet and citrus pulp have not heretofore found significant commercial use. Such cellulose has always been viewed as possessing no exceptional physical or chemical qualities. Accordingly, the isolation of cellulose derived from sugar beets and other parenchymal cell sources has not been the object of significant study apart from the traditional areas of paper making, formulation of cellulosic chemicals, and the like. Accordingly, it has not been known to isolate parenchymal cell cellulose from sugar beet pulp or from other parenchymal cell-containing plants.

It has not been known to provide processes which permit the simultaneous, sequential isolation of both cellulosic and hemicellulosic constituents of sugar beet, citrus and other parenchymous pulp in high yield with a low degree of degradation of the hemicellulose. In prior attempts to isolate one or more cellulosic or hemicellulosic materials from sugar beet and other such pulps, it has not been known to treat such pulp under conditions which favor such simultaneous isolation of the important biopolymers of the pulp.

U.S. Pat. No. 4,025,356 issued to Nyman et al. discloses a method for the continuous hydrolysis of pentose-containing materials. According to this process, pentosans such as furfural, are recovered from bagasse, straw, chaff, reeds, corn husks, corn cobs, wood chips and similar materials. Lengthy hydrolysis (4-5 hours) at temperatures between 80° and 120° C. at pH's lower than 5 are disclosed. A secondary hydrolysis at higher temperatures (between 140° and 180° C.) to facilitate the isolation of furfural is also disclosed.

U.S. Pat. No. 4,018,620 to Penque discloses the isolation of monosaccharides from cellulose through hydrolysis with low cnncentrations of acid. Hydrolysis with calcium-chloride and inorganic acid yields, for example, glucose from cotton fibers, or alpha cellulose.

U.S. Pat. No. 4,029,515 issued to Kiminiki et al. discloses a process for the decrystallization of cellulose through the mixing thereof with phosphoric acid followed by extraction with aqueous tetrahydrofuran at room temperature.

U.S. Pat. No. 4,160,695 issued to Dietrichs et al. discloses the production of glucose from cellulose-containing vegetable matter through treatment with saturated steam at a temperature from about 160° to 230° C. for a period of from 2 minutes to 4 hours. Subsequent treatment with alkali liberates the products. It is also disclosed to treat vegetable matter containing xylans with steam at a temperature of from about 180° to 220° C. for periods of time from 5 minutes to 60 minutes. Liberation of xylan hemicellulose may be accomplished thereby.

U.S. Pat. No. 4,174,976 issued to Tsao et al. discloses the acid hydrolysis of cellulose to obtain glucose. Certain co-reactants are added to improve the degradation of the crystalline cellulose.

U. S. Pat. No. 4,281,063 to Tsao et al. isolates cellulose from cellulosic materials through acid or base treatments to remove the hemicellulose followed by solvent extraction of the residue to dissolve the cellulose and by reprecipitation thereof. The reprecipitated cellulose is hydrolyzed either with acid or by enzymes. The initial hydrolysis is acid catalyzed with from about 0.5 to 5% sulfuric acid at about 90° to 140° C. for from 15 to 300 minutes.

U.S. Pat. No. 4,266,981 issued to Tsao et al. discloses a new step in the acid hydrolysis of cellulosic materials. The first stage hydrolyzes cellulose with dilute acid to remove the hemicellulose portion to yield a liquid hydrolysate containing pentose sugar. Hydrolysis of the solid residue with a small amount of concentrated sulfuric acid dissolves and partially hydrolyzes the remaining cellulose which may be then separated from lignin, reprecipitated and subsequently hydrolyzed to glucose.

U.S. Pat. No. 4,023,982 issued to Knauth discloses the hydrolysis of hemicellulosic materials with acid and steam to isolate the constituent sugars. Isolation of the hemicelluloses is not disclosed.

Loeb et al. in "Preparation of Cotton Cellulose IV from Cotton Cellulose III", *J. Poly. Sci.*, Vol. IXV, No. 73 (1954), reports that cellulose III may be transformed into cellulose IV through dissolution in glycerine for 64 hours followed by heating for 3 hours at 250° C. under nitrogen. The structure of cellulose IV was said to be "considerably degraded by the high temperature glycerin treatment . . . ".

U.S. Pat. Nos. 3,212,932 issued to Hess et al., and 4,237,226 issued to Grethlein, also refer to the hydrolysis of cellulosic vegetable material to recover constituent mono saccharides.

U.S. Pat. No. 4,201,596 issued to Church et al. discloses the continuous saccharification of cellulosic materials through high temperature acid hydrolysis. Use of strong mineral acid and steam at elevated temperatures for short time periods such as from under 1 to over 5 minutes results, according to Church, in the depolymerization of cellulose into its constituent sugars.

Isolation of hemicellulosic materials from plant waste has also been the subject of patents and publications. Thus, U.S. Pat. No. 4,160,695 discloses the non-acidic treatment of vegetable matter with steam at temperatures of from about 180° to 220° C. for from 5 minutes to 60 minutes to liberate xylan hemicellulose. U.S. Pat. No. 4,239,906 issued to Antrim et al. discloses the isolation of cellulose and hemicelluloses from corn hulls. "Relatively mild conditions", a pH from 2.2 to 5.5, at temperatures from 70° to 100° C. for from about 30 to 60 minutes are employed to liberate hemicellulose fractions from cellulosic residue. Antrim teaches that more vigorous hydrolysis such as hydrolysis at pH levels below about 1 for longer periods at higher temperatures are suitable for the isolation of cellulose but cause substantial degradation of the hemicellulose fraction.

Numerous patents issued to Battista including exemplary U.S. Pat. Nos. 3,141,875 and 2,978,446 are drawn to the production of microcrystalline cellulose. Such cellulose is not predominantly parenchymal in origin and may not be obtained concomitantly with the isolation of hemicellulose.

U.K. Patent No. 2,066,145 issued to I.T.T. discloses a cellulose denominated "microfibrillated cellulose". Such material is created by shearing a liquid suspension of cellulose derived from wood pulp.

Other U.S. patents disclose treatment of cellulosic materials with differing combinations of pH, temperature and time. These include U.S. Pat. Nos. 4,070,232 issued to Funk, 3,479,248 issued to Nobile, 4,168,988 issued to Riehm et al., 2,803,567 issed to Owens and British patent No. 555,842 issued to McDowell. Certain literature surveys are of interest including "Extraction of Hemicelluloses from Plant Materials" by Yanobsky, *Industrial and Engineering Chemistry*, January 1939, pp. 95 et.seq.; and Miller and Savage, "By-Products from Sugar Beets", *Chemurgic Digest*, April 1948. None of the foregoing references are believed to suggest the critical combination of pH, time, temperature, and mechanical shear taught by the present invention which allows the isolation of cellulosic and hemicellulosic components of sugar beet pulp without substantial degradation thereof. None of the foregoing discloses the novel cellulosic products which may be obtained from parenchymal cell-containing material through the practice of the present invention. Moreover, none of the foregoing disclose or suggest novel gums which may be obtained from the practice of certain embodiments of this invention.

OBJECTS OF THE INVENTION

It is an object of this invention to provide methods for the production of biopolymers from parenchymal cell-containing plant material, especially sugar beet and citrus pulp.

It is a further object of this invention to provide such biopolymers through processes which enable the isolation of cellulosic and hemicellulosic materials concomitantly without substantial undesired degradation of either.

It is a still further object of this invention to provide novel cellulosic materials comprising parenchymal cell cellulose.

Yet another object is to provide parenchymal cell cellulose which has been substantially isolated from vascular and other non-parenchymal cellulose plant material.

It is a further object to provide hemicelluloses including arabinogalactan and pectin simultaneously from sugar beet and citrus pulp without substantial degradation of either.

Still a further object is to provide cellulose in the form of platelets which are substantially free of hemicellulose.

Another object is to isolate the cellulose structural components of parenchymal cells.

Still another object is to provide dispersed preparations of parenchymal cell cellulose either with or without admixture with hemicellulosic components.

An additional object is to provide novel hemicellulosic vegetable gums.

These and other objects will become apparent from a review of the present specification.

SUMMARY OF THE INVENTION

It has been discovered that parenchymal cell-containing plant material, especially sugar beet and citrus pulp, can be hydrolyzed either in strong acid or in strong base at high temperature for short periods of time in adjunct with mechanical shearing to yield cellulosic and hemicellulosic biopolymers without excessive degradation thereof. It has also been discovered that the cellulose comprising the cell walls of parenchymal cells of certain plants, especially of sugar beets and citrus, possesses a unique morphology together with unique chemical and physical properties. Moreover, suspensions of such parenchymal cell cellulose, PCC, when isolated from such plants, demonstrate highly beneficial rheological behavior. Additionally, it has been found that hemicellulosic extracts of sugar beet and citrus pulp may be prepared to yield novel vegetable gums having wide potential utility.

DETAILED DESCRIPTION OF THE PREFERRED EMBODIMENTS

It has been found that cellulosic and hemicellulosic components of parenchymal cells, especially parenchymal cells derived from sugar beets and citrus, may be isolated to yield valuable biopolymeric materials. More particularly, it has been found that both pectins and arabinogalactans of sugar beet and citrus pulp may be isolated concomitantly without excessive degradation of either. In this regard, it has been found possible to produce a novel and commercially valuable gum from hydrolyzed sugar beet and citrus pulp, which gums may be viewed as comprising such pectins and arabinogalactans together with certain, optional, derivatives thereof.

It has also been discovered that the cell walls of parenchymal cells, especially parenchymal cells found in sugar beets and citrus, possess unique morphologies. A method for the isolation of such cells from non-parenchymal cellulosic and other structures of sugar beet pulp or other parenchymal cell sources has been discovered. Moreover, dispersions and suspensions of such cellulosic components of parenchymal cells have been made and have been found to possess unique rheological, chemical and physical behaviors and properties.

An understanding of the structural organization of cellulose-based articles is helpful to an understanding of the present invention. It will be appreciated to those skilled in the art that numerous systems have been used to describe cellulosic infrastructure in the past. The present organizational tableau has been developed in order to focus attention upon the differences among various materials comprising cellulose.

Cellulose is known to comprise a linear array of $\beta_{1-4}$ D-glucopyranose units. With regard to this primary form, all celluloses are the same. Thus, starch and dextran, which are also glucose homopolymers, differ at this level of analysis.

The arrangements of chains of $\beta_{1-4}$ D-glucose within a particular form of cellulose comprises its secondary structure. Thus, the chains may be arrayed in parallel, anti-parallel, or complex structures; they could also be arranged in a random fashion. It is at this secondary level of structure that cellulose types have been recognized by those skilled in the art. Representative of these types are cellulose I, II, III, and IV which comprise the known forms of crystalline cellulose. The random chain arrangement, which may be more or less random depending on the pedigree of the cellulose, comprises amorphous cellulose. The microcrystalline cellulose, MCC, of Battista as discussed above is distinguished from other forms of cellulose at this level of structure.

The crystalline regions comprising the secondary structure of cellulose may in turn be arranged to form a tertiary structure. Thus, regions of varying crystallinity may be dispersed inter se or among areas of amorphous cellulose to form varying tertiary structures. Accordingly, structures such as fibrils, bundles, sheets, and the like may be seen to comprise tertiary structures. The cell wall of a parenchymal cell is best described as a tertiary structure. In this regard, such a parenchymal cell wall of a sugar beet is easily distinguished from, for example, a vascular bundle, which may also be found in sugar beets.

The quaternary structure of a cellulosic material is best understood as being an arrangement or combination of tertiary structures. Thus, the plant vascular bundle known as phloem may be distinguished from a similar vascular bundle, xylem, as having a different quaternary structure even though the tertiary structures may be similar or even identical. Similarly, parenchymal cell walls (tertiary structures) may be constructed somewhat differently to form the parenchymal cells of, for example, sugar beets and apples or grapes. Quaternary structure may also be envisioned as comprising macroscopic assemblages such as an apple or grape versus a sugar beet. Such structures will, of course, comprise non-cellulosic materials as well.

In view of the foregoing, it will be appreciated that the structure represented by the cell walls of parenchymal cells such as those found in sugar beets is distinct in kind from the various secondary structures known to those skilled in the art and from other tertiary an quaternary structures. It has now been found that such cellulose derived from cell walls of parenchymal cells, hereinafter referred to as parenchymal cell cellulose or PCC, has unique physical, chemical and rheological properties. Moreover, dispersions of such parenchymal cell cellulose, especially in aqueous media, have other useful physical and rheological properties as well. It is believed that isolation of parenchymal cell cellulose has not heretofore been accomplished and that such cellulose and cellulosic dispersions have not heretofore been known.

The chemical and functional uniqueness of PCC is thought to be related to its secondary and tertiary structure. Primary structure, the way in which the D-glucose molecules are combined to form a linear polymer, is the same for all cellulose. The primary structure chains have high affinity for each other and spontaneously self-associate to form a secondary level of sructure which reflects their ordered grouping and spatial arrangement with respect to each other. It is here that PCC begins to significantly differ from other forms of cellulose. Low angle x-ray crystallography indicates that the PCC is either composed of a unique combination of the polymorphic crystal types I and II or type IV, a relatively rare crystalline structure which has not been well studied. The secondary structural domains are arranged, in combination with low order or amorphorous regions, into elementary morphologiclly distinctive units of tertiary structure. hhe tertiary structural element of PCC is not known, but does not appear from high resolution, electron microscopic examination to be a microfibril structure as found in isolated celluloses derived from woody plant tissue. Therefore, the membrane morphology of PCC probably reflects an integrated secondary and tertiary hybrid structure. Structural specialization forming the basis of functional plant tissue is reflected by quaternary structure whereby the tertiary structural elements are combined with other macromolecular substances such as hemicelluloses, lignins, proteins, etc. This invention is concerned primarily with structural manipulation at the quaternary level although some impact upon more primary levels of structure would be expected. In contrast, production of other highly functional celluloses such as microfibrillated cellulose and microcrystalline cellulose from high purity alpha cellulose wood pulps primarily reflects structural manipulation at the tertiary and secondary levels, respectively.

According to a most preferred embodiment of the present invention, both hemicellulosic and cellulosic components of sugar beet pulp or other parenchymal cell-containing plant material are isolated essentially simultaneously without substantial degradation of either component. Such may be accomplished through hydrolysis of spent sugar beet pulp (or other plant material containing parenchymal cells in high proportion) under conditions of extreme pH and high temperature for relatively short periods of time in association of physical shearing.

According to one embodiment of this invention, the acid hydrolysis of sugar beet pulp is accomplished at pH's below about 4.5 and preferably at pH's below about 4.0 and even more preferable between 4.0 and 2.0. This condition of strong acidity is maintained at a temperature above room temperature and for a period of time which is sufficient substantially to liberate pectin and arabinogalactan from the sugar beet pulp but which is not sufficient to substantially degrade the same.

It is preferred that a temperature greater than about 125° C. be employed. It is more preferred to employ temperatures from about 125° C. to about 250° C. and even more preferred to employ temperatures between about 140° C. and about 200° C. Still other preferred embodiments employ temperatures between about 150° and 180° C.

As will be appreciated by those skilled in the art, reaction times which are sufficient to liberate hemicellulosic components from sugar beet pulp, pectins and arabinogalactans, will vary depending on the pH employed and the reaction temperature. It is preferred that reaction times less than about 600 seconds be employed. It is still more preferred that reaction times less than about 360 seconds be so employed with a still more preferred range being reaction times below about 200 seconds. In general, reaction times effective to liberate the components will be greater than about 15 seconds and preferably greater than about 30 seconds. According to one preferred embodiment of the present invention, sugar beet pulp in aqueous slurry was acidified to a pH of about 2.5 with concentrated hydrochloric acid and hydrolyzed for approximately 120 seconds at 160° C. In accordance with another embodiment, unlimed citrus pulp was acidified to a pH of about 2.2 with HCl and hydrolyzed for about 170 seconds at about 165° C. As will also be understood by those skilled in the art, wide combination of pH's, reaction time and temperature will be satifactory for performing one or more of the embodiments of the present invention.

In consequence of the foregoing analysis, those skilled in the art will appreciate that it is best to define the reaction conditions by what they accomplish rather than by their numerical values. Thus, a sufficient combination of pH, reaction time and reaction temperature which allows the liberation of pectin and arabinogalactan from spent sugar beet pulp (or other parenchymal cell containing plant material) without the substantial degradation thereof is desired. In this context, substantial degradation refers to degradation in excess of approximately 25% of the total mass of either pectin or arabinogalactan component. For certain preferred embodiments, it is preferred that such degradation be minimized. For others, a certain degree of degradation may be allowed or even encouraged such as when novel vegetable gums are desired. It is believed that from analysis of the foregoing discussion concerning reaction conditions, one of ordinary skill in the art will readily be able to appreciate those modifications which must be made in the combination of pH, reaction time and reaction temperature to allow the isolation of hemicellulosic components, of, for example, sugar beet pulp, for any particular purpose.

It is believed that the presently indicated combinations of strongly acidic pH, relatively high temperature and relatively short reaction time have not heretofore been suggested for use in connection with parenchymal cell containing material. It is believed that it is this combination of factors which is partly responsible for the isolation of the hemicellulosic components of sugar beet pulp without substantial degradation.

The isolation of the hemicellulosic components of sugar beet pulp or other parenchymal cell containing plant material may also be accomplished in strongly alkaline conditions. Thus, combinations of high (strongly basic) pH, relatively high temperature and relatively short reaction times may be so employed for such isolation. Again, this combination of stringent pH at high temperatures for short times allows the isolation of hemicellulosic components from such plant materials without substantial degradation. In this regard, it is preferred that pH's greater than about 10.0 be employed for this hydrolysis. It is still more preferred to employ pH's between about 10.5 and about 13 and even more preferred to employ pH's from about 11.5 to about 13.

Combinations of pH, time and temperature may be varied by those skilled in the art while not departing from the spirit of this invention. Such persons will appreciate that variations of such parameters may be employed to modify the total output of hemicellulosic materials to be produced in accordance with this invention and that diverse vegetable gums may be formulated thereby. In accordance with the practice of this invention employing alkaline hydrolysis, conditions of time and temperature are employed which are substantially sufficient to isolate the hemicellulosic component without substantial degradation thereof. In this regard those skilled in the art will appreciate that the hemicellulosic component present as pectin will be quickly hydrolyzed under basic conditions to salts of pectinic acids. Such pectinic acid materials are also commercially desirable and lead to useful vegetable gums and other materials.

The times and temperatures which are useful for the alkaline hydrolysis in accordance with the present invention are similar to those which are useful for the acid hydrolysis. Thus, temperatures between about 125° and 250° C. may be employed. It is preferred that temperatures between 140° and about 200° C. be employed while still more preferred are temperatures between about 150° and 180° C.

Reaction times less than about 600 seconds are preferred with reaction times less than about 200 seconds being more preferred and reaction times from about 30 to about 200 seconds are still more preferred for certain embodiments. In general, reaction times greater than about 15 seconds are needed.

The acid or basic hydrolysis of sugar beet pulp or other parenchymal cell-containing materials to isolate hemicellulosic components is greatly facilitated by the employment of physical shearing in connection herewith. It is preferred that hydrolysis be conducted in conjunction with physical shearing to maximize the production of hemicellulosic components. On this regard, it is believed that the physical stressing or shearing assists in the disruption of the intracellular organization of sugar beet pulp and facilitates the liberation of hemicelluloses. A wide variety of apparatus may be employed to effect such physical shear. Thus, in accordance with the preferred embodiment, a tubular reactor is employed which passes a slurry of parenchymal cell containing material at elevated temperature and pressure and at the desired pH through its length to one or more exit orifices. The slurry is then sprayed or "shot" through the orifice into a region of lesser pressure. This technique, which is well known to those skilled in the art in terms of flash evaporation and other processes, provides a source of mechanical shear which is well suited to the practice of the present invention.

Other forms of mechanical shearing may also be employed such as a Waring blender or other device. With certain embodiments, shearing may be accomplished through ultrasonics or through any other technique which serves to effet substantial disruptions of the cellular organization.

It is most convenient to employ physical shearing simultaneously or shortly subsequent to the hydrolysis of sugar beet pulp or other plant material. Thus, the tubular reactor with "blow down" exit orifice is greatly preferred due to consideration of convenience and cost. It is also possible, however, to employ hydrolysis and physical shearing in separate steps. Thus, the plant material may be hydrolyzed under conditions of pH, time and temperature as hereinabove described, and stored under non-hydrolytic conditions prior to, for example, batchwise physical shearing in a blending device. Other modifications of the hydrolysis/physical shearing scheme will also be apparent to those skilled in the art.

The foregoing hydrolysis coupled with physical shearing also serves to liberate parenchymal cell cellulose from parenchymal cell-containing plant material, especially sugar beet pulp. It is believed that the various forms of bonding between the parenchymal cell walls comprising parenchymal cell cellulose and other forms of cellulose in spent sugar beet pulp or other plant material is disrupted through the combination of hydrolysis and physical shearing. In this regard, it may be envisioned by those skilled in the art that vascular bundles and other non-parenchymal cellulosic bodies (tertiary structures) of the plant material are caused to become disassociated such that the parenchymal walls may be isolated therefrom. In this regard, it should be born in mind that parenchymal cell cellulose is believed to be substantially more inert towards degradative processes than are the other types of cellulose present in such plant material. Accordingly, following such disruption of the cell organization, non-parenchymal cellulosic materials tend to hydrolyze or otherwise degrade while parenchymal cell cellulose tends to remain intact for isolation and further use.

A preferred reactor useful for the acid or basic hydrolysis in accordance with one or more embodiments of the present invention comprises a tubular design. Thus, twelve stainless steel or other tubes having approximately 1/2 inch inside diameter are parallel mounted through a 25 foot length of 12 inch inside diameter pipe and connected in series. Means are provided for introducing steam or other heating source into the outer jacket of the reactor in a controlled fashion so as to provide the desired temperature in the reaction tubes. An input pumping means is also provided for feeding a stream of pH adjusted plant material slurry into the reactor tubes. The exit end of each reactor tube is provided with an orifice of small cross-sectional dimension typically ⅛ to ¼ inch. The orifice serves a dual purpose of maintaining internal pressure within the reactor tubes and of providing a high mechanical shearing effect upon the exit product stream when the same is forced therethrough.

In typical hydrolytic reactions in accordance with this invention, pulp is fed to the foregoing tubular reactor at head pressures ranging from about 200 to about 300 pounds per square inch. Superficial linear velocities at the exit orifice have been estimated from about 10 to 100 meters per second. Thus, strong shear forces are encountered at the orifices. The product of the reactor is effectively "flashed" to atmospheric pressure after exit from the orifices and passed to subsequent processing operations.

While numerous reaction protocols may be employed by those skilled in the art for the practice of one or more embodiments of the present invention, in general, a slurry of plant material such as spent sugar beet pulp suspended in aqueous medium is adjusted to the desired pH, either strongly acid or strongly alkaline, and passed through a suitable reaction apparatus such as foregoing tubular reactor. The pH modified slurry is subjected to combinations of temperature and time at a pressure generally above atmospheric pressure. The material is then, in accordance with the preferred embodiment, passed through an exit orifice to atmospheric pressure to effect physical shearing.

The resulting material may be viewed as having solid and liquid components. Separation of the solid and liquid material is generally followed by further processing. The solid material may be viewed as crude parenchymal cell cellulose mixed with other cellulosic debris such as vascular bundles and the like. Additionally, other solid components may be present. It is preferred that the crude parenchymal cell cellulose be bleached or otherwise rendered more suited to dispersion by contact with a bleaching medium such as hypochlorite, peroxide, or other material. The bleaching step facilitates mechanical classification and subsequent isolation of substantially pure parenchymal cell cellulose from non-parenchymal cell residuum.

The liquid component of the hydrolysis reactions comprises the hemicellulosic components thereof together with certain other materials including some partial hydrolysis products of cellulose, other plant biopolymers such as fat, proteins, etc. and other soluble detritus. Alteration of pH together with filtration and/or clarification yields a liquid which may be concentrated into a vegetable gum. Modification of the hydrolytic procedure will lead to diverse species of vegetable gums.

Parenchymal cell cellulose displays several unique properties. A low-solid slurry of PCC, such as about 1% to 2% by weight in water, forms a stable homogeneous suspension following high shear homogenization. This suspension possesses a beneficial rheology, probably due to the platelet form of the PCC thus obtained. Thus, highly dispersed PCC suspensions have high resting viscosities and possess pronounced thixotropic and pseudoplastic characters. Dispersed PCC can form thin, hard, translucent films upon drying. These films are extremely difficult to rehydrate and adhere strongly to polar surfaces such as ceramic and wood composites. PCC itself is unusually stable to both acidic and basic conditions and is the most chemically inert cellulose presently known.

The solution rheology of a PCC dispersion is pseudoplastic and is characteristic of a hydrocolloid suspension. It is believed that the microplatelet structure of PCC is responsible for the unique solution rheology of the dispersed preparation. The highly hydrated platelets are similar in density to water and form gravitationally stable suspensions. The gross shape of hydrated PCC is that of an elongated ellisoid although there is considerable heterogeneity of shapes. The average major dimension is 20 to 100 microns with a membrane thickness of several hundred angstroms. In the range of 0.5 to 1.5% w/w the viscosity of a bleached PCC suspension obeys the power law, $\beta = k \, (dv/dt)^n$. At 1% w/w PCC, $n=0.65$ and $k=0.36$ lb./100 ft.$^2$. In the moderate imposed shear range (10 to 100 s$^{-1}$), PCC viscosity behavior can be approximated by the Bingham plastic model used commonly for characterizing colloidal suspensions. The mild thixotropic behavior exhibited by PCC results from time dependent translational relaxation or membrane alignment upon standing or mixing, respectively. The platelet-like membranes are extremely durable to shear and are not affected by extremes of temperature, salts or pH. At PCC concentrations in excess of 2%, w/w interparticle interaction begins to dominate factors influencing the solution rheology and the viscosity rapidly increases. At 4% w/w PCC forms a zerogel.

The cellulose isolated from citrus pulp is somewhat different than that obtained from the sugar beet. While citrus PCC morphology is predominantly membranous, there is considerable heterogeneity of size; the majority of the particles cannot be sprayed through a 100 mesh screen. This is in contrast to PCC from sugar beets which has a relatively uniform particle size, and, aside from the fiber fraction, is easily rinsed through a 100 mesh screen. The citrus pulp cellulose (CPC) is a film former like PCC and displays a similar homogenate rheology.

In the absence of water, the membrane microplatelets strongly associate by hydrogen bonding. The intermembrane interaction is unusually effective upon drying due to the high surface area to volume ratio of the platelet structure. Upon drying, PCC forms a transparent film on flat surfaces and in the case of polar materials such as ceramics or wood, the film strongly adheres to the surface. Depending upon the density and efficiency of hydrogen bonding interaction, dried PCC films may be extremely difficult to rehydrate.

Table 1 summarizes some selected properties of three PCC samples. Sample A was a washed, dried and ground acid converted beet press cake (see Example 6, run #4). It represents a crude form of PCC and contains color bodies and a small amount of fibrous cellulose. Samples B and C are high purity beet PCC's which have been bleached and mechanically defibered (see Example 5). Sample B was dried and ground while Sample C was a hydrated cake which had never been dried.

TABLE 1

|  | PCC A | PCC B | PCC C | Sulfite Paper Pulp (Softwood) | Acetylation Grade Kraft | Regular Grade Acetate |
|---|---|---|---|---|---|---|
| 1. Intrinsic Viscosity |  |  |  |  |  |  |
| 0.5% Cuene, cp | 2.1 | 3.9 | 3.7 |  |  |  |
| Nitrate D.P. |  |  |  |  |  |  |
| TEM Translation | 315 | 665 | 625 |  |  |  |
| 2. Elrephro Brightness | 27 | 52 | 48 |  |  |  |
| 3. Level-off Intrinsic |  |  |  |  |  |  |
| Viscosity, cp | 0.73 | 1.15 | 1.13 | 1.65 | 0.73 | 1.15 |
| Level-off C.P. |  |  |  |  |  |  |
| TEM Translation | 76 | 133 | 130 |  |  |  |
| 4. Acetylation Reactivity |  |  |  |  |  |  |
| Reaction time, min. | >>200 | — | >>200 | 200 | 50 | — |
| Clogging Constant, ml | 24 | — | 5.8 | 1–2 | >100 | — |
| Haze | >>300 | — | 200 | 400 | 10 | — |
| Color, yellow coeff. | 0.5 | — | 0.5 | 0.7 | 0.3 | — |
| 1/0 unreacted | 1.5 | — | 17.8 | 1–3 | 0–1 | — |

Table 2 lists several selected analyses upon a crude PCC from an acid converted beet pulp (sample D) and a high purity beet PCC which has been bleached and classified (sample E). Both acid converted pulps were prepared by the condition of Example 6, run #4.

TABLE 2

|  | Sample D | Sample E |
|---|---|---|
| Elrephro Brightness | — | 59.2 |
| Aged Brightness (60 min @105.C) | — | 49.1 |
| Ether Solubles, % | 0.11 | 0.18 |
| Alpha Cellulose, % | — | 58.7 |
| Ash @575.C, % | 2.61 | 13.1 |
| Iron, Fe in ppm | 326 | 285 |
| Manganese, Mn in ppm | 7.4 | 12 |
| Copper, Cu in ppm | 5.1 | 12 |
| Chloride, Cl in ppm | 0.53 | 4.82 |
| Cuene Viscosity, cp | — | 3.6 |
| Carboxyl, meq./100 g. | — | 8.67 |
| Silica, SiO2 in ppm | 7934 | 6281 |
| Potassium, K in ppm | 272 | — |
| Klason Lignin | 6.84 | — |
| Permanganate No. | 16.9 | — |

The general compositional profile of purified beet PCC indicates the average degree of polymerization of about 600. The relatively low brightness is a consequence of high inorganic content probably resulting from low purity process water. The bleached PCC displays moderate cation exchange capacity associated with carboxyl functionality probably generated by minor oxidation of the carbohydrate. This may explain more facile rehydration of bleached versus unbleached PCC. The relative low acetylation reactivity of PCC indicates an unusually high inherent chemical stability associated with a significant portion of its cellulosic content. This also is consistent with the relatively low value obtained from the standard alpha cellulose test.

Parenchymal cell cellulose, either in native form or in suspension may be employed in a wide variety of materials where its unique properties are a benefit. Thus, it may be employed as an additive in water based lubricants and may be used for rheological control. It presently shows promise as a viscosity and water loss control agent in well drilling, especially in oil and gas drilling situations including both circulating and non-circulating fluids. In this regard, its temperature and salt stability are noteworthy features. Native, isolated parenchymal cell cellulose may be employed as tableting and other dispersion media. Moreover, such celluloses may be used as extenders in many food and drug formulations. A wide variety of aqueous and other coating materials may be formulated including parenchymal cell cellulose. It is believed that substantial cost savings may be had with the formulation of paints and other industrial coatings. In this regard, the substantial inertness of parenchymal cell cellulose together with its excellent coating properties are primary, beneficial features.

The hemicelluloses of sugar beet pulp may also be isolated and formed into vegetable gums. These vegetable gums, which may be obtained through the practice of certain of the embodiments of the present invention, also exhibit beneficial properties. Thus, such gums are excellent oil/water emulsifiers at low concentrations such as from about 0.5% to about 1% by weight. Such gums have remarkable acid and temperature stability and show unusually good adhesive properties for polar materials such as paper and ceramics. The gums are capable of forming true aqueous solutions even at high solid concentration up to about 30 to 40% by weight. The materials are free flowing and have desirably low viscosity. Similar gums are expected to be isolated from citrus and other parenchymous plant materials. Citrus hemicelluloses are believed to have overall higher molecular weights and, accordingly, to be more sensitive to salt and hydrolysis than beet pulp.

According to certain embodiments of the present invention, the pectin component of the hemicellulose derived from sugar beet and citrus pulp may be saponified under alkaline conditions to give anionic oligomer pectinic acid which can form gels in the presence of calcium or other divalent or polyvalent metal salts. Thus, through employment of various degrees of saponification or other modification of the basic vegetable gums obtained through the practice of one or more embodiments of the present invention, a family of novel vegetable gums may be obtained thereby. It is anticipated that such gums will find many industrial and other use and that they will become commercially competitive with many of the presently used natural gums such as alginates and gum arabic.

Those skilled in the art will appreciate that the foregoing is merely illustrative of certain preferred embodiments in accordance with the present invention. The following examples are offered for the purposes of further explication of this invention and to allude to certain other preferred embodiments. Those skilled in the art will readily appreciate that numerous modifications of the overall reaction schema may be employed without deviation from the spirit of this invention.

Additional disclosure and examples are also presented in a copending application by the present inventor, Well Drilling and Production Fluids Employing Parenchymal Cell Cellulose, which is incorporated herein by reference.

EXAMPLE 1: SIMULTANEOUS ISOLATION OF CRUDE PCC AND HEMICELLULOSE WITH ACID HYDROLYSIS

Spent sugar beet pulp which had been sun dried was rehydrated by soaking in water for 14 hours at room temperature. The pulp slurry was passed through a classifier/grinder to reduce the remaining cossettes to irregular particles having major dimensions less than about 0.5 centimeters. This slurry was treated on a two stage, continuous belt press to yield a pulp cake containing about 15% solids. The cake was resuspended in water at a level of about 4% total solids and the pH adjusted to 2.5 with concentrated hydrochloric acid. The slurry was then passed through the 300 foot long tubular reactor, described hereinbefore at 160° C. using a ¼ inch diameter exit orifice. The pumping rate was adjusted to give a total residence time of about 115 seconds. It is believed that approximately the first 25 seconds of the residence time in the reactor were required for thermal equilibration of the reactor stream with the reactor jacket. The emerging product stream was flashed to atmospheric pressure to yield a material having the physical consistency of thick gruel. The material balance indicated nearly quantitative recovery of the pulp solids with about 50% in a particulate form and about 50% solubilized. Microscopic examination showed a highly dispersed, cellular debris. The crude parenchymal cell cellulose (PCC) having admixed vascular and other cellulosic materials was mechanically dewatered to a 15% solids cake via a two stage continuous belt press. The recovered press juice was found to contain about 90% of the total dissolved solids indicating that a significant amount of water remaining in the pulp cake was "bound" and not interstitial.

The pH of the press juice was adjusted to about 5.2 with concentrated sodium hydroxide and the solution subjected to filtration in a filter press. The clear solution was then concentrated to a 25% w/w solids consistency via a single stage vacuum evaporator to yield an amber liquid containing about 50% arabinogalactan, about 40% pectin and about 10% polymers of unknown but probably similar composition (probably calcium pectates, proteins and tannins).

EXAMPLE 2: BLEACHING OF CRUDE PCC

Crude PCC from Example 1 was bleached with various concentrations of sodium hypochlorite, NaOCL, ranging from 0.1 to 3.0% w/w in one percent w/w PCC slurries adjusted to pH 9.0 via concentrated HCl or NaOH. The slurries were allowed to incubate at room temperature for 16 hours. The results are as follows:

| [NaOCl] w/w | RESULT |
| --- | --- |
| 3.0% | Bleached white in 20 min.-filter cake had buttery consistency, sticks to filter paper. |
| 2.0% | Bleached white in 20 min.-filter cake had buttery consistency, sticks to filter paper. |
| 1.0% | Bleached white in about 1 hr.-filters with difficulty but more easily than the 2% reaction. |
| 0.5% | Bleached slowly-after 16 hrs. was white, easily filtered. |
| 0.1% | Incompletely bleached after 16 hrs. but definitely lighter than control. |
| 0.0% | Gray-control. |

EXAMPLE 3: BLEACHING OF CRUDE PCC

The NaOCl bleaching reaction with PCC is pH dependent and is favored by lower pH. The aqueous bleaching conditions were 1% NaOCl and 1% PCC w/w at 20CC.

| pH | NaOCl | DRY WT. RE-COVERED FROM FILTER CAKE | OBSERVATION |
|---|---|---|---|
| 7.0 | 1% | 3.17 g/300 ml | Fast bleaching complete in min., normal PCC rheology. |
| 9.0 | 1% | 3.21 g/300 ml | Bleaching complete in 2 hrs., normal rheology. |
| 11.0 | 1% | 3.10 g/300 ml | Bleaching complete in 2 hrs., normal rheology. |
| 11.0 | 0% | 3.43 g/300 ml | Gray-control. |

The Pcc does not appear to undergo a major weight loss upon NaOCl bleaching, nor is a significant change in the behavior of the dispersion observed.

EXAMPLE 4: BLEACHING OF CRUDE PCC

In addition to NaOCl, hydrogen peroxide, $H_2O_2$ has been found to bleach PCC. With $H_2O_2$, the membrane fraction bleaches well while the fiber fraction is bleached to a lesser extent than with NaOCl. A 1% PCC mixture was subjected to $H_2O_2$ bleach under slightly acidic conditions at several concentrations for 16 hrs. The results are summarized as follows:

| $[H_2O_2]$ w/w | COMMENT |
|---|---|
| 5.0% | Substantial foaming, bleached not as white as NaOCl in 16 hrs. due to off-white fiber fraction. |
| 2.5% | Less foaming, bleached to same extent as 5%. |
| 1.0% | Slight foaming, bleached to same extent as 5%. |
| 0.0% | Control-gray color. |

EXAMPLE 5: ISOLATION OF PCC

Bleached, crude PCC slurries from any of Examples 2–4 were subjected to mechanical classification and rinsing. The bleached material was rinsed by a jet water spray through a 90 mesh screen which retains small fibers and non dispersed particles from the cellulose suspension. The resulting 90 mesh cellulose suspension was collected and dewatered on a 200 mesh platform screen. During mechanical classification and rinsing, about 25% of the cellulose was removed as crude fiber and 75% recovered as a highly dispersed, cellulose parenchymal cell membrane material at about 3% to 5% w/w solids. The resulting fine, white particulate suspension was mechanically dewatered with a two stage, continous belt press to a 10% w/w solids cake for storage. Unbleached, crude PCC preparations can be similarly classified to obtain a light grey, cell membrane preparation.

EXAMPLE 6: ACIDIC EXTRACTION OF BEET PULP

Sun dried sugar beet pulp was hydrated, chopped in a modified food disposal unit and the solids level adjusted to approximately 5% w/w. Ottionally 1000 ppm $NaHSO_3$ was added to the slurry. The total non-volatile solids concentration was determined to be 4.0% w/w. A series of five reactor conditions for the tubular reactor described hereinbefore were employed involving combination of 3 pH's and 3 residence times. The residence times were varied by changing the length of the tubular reactor sequence. The superficial linear velocity across the 0.25 inch diameter exit orifice ranged from 500 to 600 cm/sec. The conditions are summarized as follows:

| RUN # | pH INLET | RESIDENCE TIME | pH OUTLET | $NaHSO_3$ |
|---|---|---|---|---|
| 1 | 3.7 | 25 sec. | 4.0 | + |
| 2 | 2.6 | 26 sec. | 2.9 | − |
| 3 | 2.4 | .25 sec. | 2.7 | + |
| 4 | 2.4 | 104 sec. | 2.9 | + |
| 5 | 2.4 | 182 sec. | 2.9 | + |

The results of a gross material balance on the exit reactor stream are found below. Particulate solids were defined as those retained on a 325 mesh nylon filtration cloth. Final drying of both soluble and particulate solids fractions was performed in an 80° C. vacuum oven for 16 hrs.

| RUN # | RECOVERED SOLUBLE SOLIDS | RECOVERED PARTICULATE SOLIDS | YIELD |
|---|---|---|---|
| 1 | 22.2% | 78.8% | 90.5% |
| 2 | 28.8% | 71.2% | 91.9% |
| 3 | 30.0% | 70.0% | 93.6% |
| 4 | 49.1% | 50.9% | 94.0% |
| 5 | 51.5% | 48.5% | 94.7% |

The supernatants were analyzed by high pressure liquid chromatography before and after enzymatic digestion of the hemicelluloses using a combination of the Rohm and Haas pectinase preparation SB80 and GB Fermentation pectinase preparation L-200 each at a dosage of 2% v/v. Arabinogalactan and pectin were estimated by the concentration of L-arabinose plus D-galactose and D-galacturonic acid, respectively, found in the enzyme hydrolysates. The initial pH of the supernatant was adjusted to 5.0 prior to addition of the enzymes and the hydrolysis allowed to proceed for 16 hours at 20° C. The HPLC system used was Biorad HPX-87H using 10 mM $H_2SO_4$ at 45° C. The analysis indicated that although the majority of hemicellulose had been solubilized by condition 5, the yield of both pectin and arabinogalactan is still increasing, albeit slowly. There is evidence that minor araban hdrolysis to arabinose is occurring under condition 5. Therefore, it would appear that a residence time of approximately 100 seconds is near optimum for the non-degradative extraction of hemicellulose at about pH 2.4 and 165° C. with the equipment configuration as described. Other tubular reactor systems would allow a difference combination of residence time, pH and temperature.

EXAMPLE 7: EFFECT OF ACID CONCENTRATION AND REACTOR TIME ON HEMICELLULOSE YIELD

Kiln dried beet pulp as ground to 10 mesh. The water content of the pulp preparation was 11.6% w/w. The reactor configuration employed was the steam jacketed, tubular reactor described previously. The reaction temperature was 165° C. The exit orifice was 1/16" diameter and the residence time is based upon the average volumetric flow rate through the reactor. A series of progressively severe hydrolysis/ extraction conditions involving variation of reaction time and/or acid concentration was performed.

Hemicellulosic solids in the supernatant of the reacted product slurry were determined on a relative scale of 1–10 by observing the volume of gravity packed precipitate resulting from the addition of 1 ml of the particulate free supernatant to 9 ml of absolute ethanol. Native arabinogalactans and pectins (also pectinic acids) are precipitated by 90% v/v ethanol. Low molecular weight oligomers of these two polymer classes remain soluble. At low pH reactor conditions, the extent of extraction is diminished by degradative, hydrolytic depolymerization of hemicellulose. Therefore, ethanol precipitated solids qualitatively reflect the overall yield of hemicellulose recovery under the low pH conditions employed.

$CaCl_2$ precipitable solids reflect, to a first approximation, the degree of extraction and/or hydrolytic conversion of pectin into pectates. At increasingly harsh reactor conditions, pectins are first converted to pectinic acids and subsequently to depolymerized products which do not precipitate in the presence of divalent cations such as $Ca++$. The precipitation test involves addition of 4 ml of an aqueous saturated $CaCl_2$ solution (20° C.) to 1 ml of the reactor product supernatant and the relative volume of the gravity packed precipitate is reported on a scale of 1 to 10.

Methanol and acetic acid resulting from hydrolysis of ester functionality associated with extracted pectins was measured by HPLC.

w/w chopped and pressed pulp solids containing 0.2N NaOH. The reactor temperature was 163° to 164° C. with a rise time in the primary coil for the feed slurry to be 90% of final temperature in 5 to 10 seconds. The superficial linear velocities of the product slurry across the 0.25 inch diameter exit orifice were 500 to 600 cm/seconds. The pH of the feed slurry was approximately 12. The reaction conditions are summarized below:

| REACTION RUN | RESIDENCE TIME | pH in | pH OUT |
| --- | --- | --- | --- |
| 1 | 57 sec. | 12.2 | 11.9 |
| 2 | 98 sec. | 12.2 | 11.7 |
| 3 | 185 sec. | 12.2 | 11.6 |
| 4 | 239 sec. | 12.0 | 11.1 |

A supernatant fraction from each reaction slurry was qualitatively examined for ethanol precipitatable solids and calcium precipitatable solids which as previously described reflect total hemicellulloses extracted and pectin/pectates, respectively. The ethanol precipitation was initiated by addition of 5 ml of supernatant to 45 ml of 95% ethanol. The calcium precipitation was performed by adding 1 ml of supernatant to 9 ml of 20% w/w $CaCl_2.2H_2O$. The results are recorded below

| REACTION | 1 | 2 | 3 | 4 | 5 | 6 | 7 | 8 | 9 | 10 | 11 |
| --- | --- | --- | --- | --- | --- | --- | --- | --- | --- | --- | --- |
| % Pulp Solids in Reactor Feed | 15 | 15 | 15 | 15 | 15 | 16.3 | 14.3 | 14.7 | 15 | 15 | 15 |
| [HCl], N | 0.01 | 0.01 | 0.01 | 0.01 | 0.01 | 0.04 | 0.09 | 0.13 | 0.10 | 0.15 | 0.15 |
| Reactor Residence Time (sec.) | 25 | 304 | 331 | 400 | 474 | 139 | 139 | 139 | 180 | 254 | 285 |
| Ethanol ppt. Solids | 10 | 7 | 7 | 8 | 8 | 6 | 6 | 7 | 6 | 2 | 1 |
| $CaCl_2$ ppt. Solids | 0 | 0 | 0 | 0 | 0 | 6 | 10 | 6 | 5 | 4 | 3 |
| Free Acetic Acid | | | | + | + | + | + | ++ | ++ | +++ | +++ |
| Methanol | | | | + | ++ | +++ | +++ | ++ | + | | |
| Arabinose | 0 | + | + | + | + | ++++ | | | | | |

Arabinose arising from hydrolytic degradation of the arabinogalactan was determined by gas chromatography of silyl derivatized samples.

The results indicate that at 165° C. the maximum amount of ethanol precipitatible hemicellulose is extracted at a relatively low acid concentration on the order of 0.01 N and a short reactor residence time of probably under 100 seconds. Increasing the residence time to several minutes at this acid concentration leads to degradation of the arabinogalactan. Increasing the acid concentration from 0.05 to 0.10 N at reactor times in the vicinity of 100 seconds leads to significant hydrolysis of ester functionality associated with the extracted pectins. At higher acid concentrations or longer reactor time, the pectin/pectinic acid tends to undergo degradative depolymerization and acetic acid is released.

Accordingly, low pH and high temperatures are desired for high yield thermomechanical extractions of hemicelluloses from sugar beet pulp.

EXAMPLE 8: ALKALINE REACTION OF BEET PULP

The tubular reactor assembly described previously was fed with a slurry having approximately 4%–5% where the weight of ethanol precipitate and volume of calcium precipitated solids weight reflect relative concentrations of pectinic acids and total hemicelluloses, respectively.

| RUN NUMBER | wt. of Ethanol ppt., mg | vol. of $Ca++$ ppt, ml |
| --- | --- | --- |
| 1 | 170 | 0.7 |
| 2 | 150 | 0.9 |
| 3 | 100 | 0.4 |
| 4 | 130 | 0.2 |

These results indicate that at 165° C. and 0.2N NaOH, the maximum yield of pectate occurs at a residence time in the vicinity of about 100 seconds, whereas the maximum ethanol precipitatable polymer is extracted at times of under about 50 sec.

The gross, gravimetric material balance results are shown below: The recovered solids have been corrected for added NaOH.

| RUN # | % RECOVERED PARTICULATE SOLIDS | % RECOVERED SOLUBLE SOLIDS | % YIELD OF RECOVERED/ CALCULATED SOLIDS |
|---|---|---|---|
| 1 | 37.0 | 63.0 | 99.0 |
| 2 | 33.2 | 66.8 | 95.9 |
| 3 | 32.5 | 67.5 | 94.5 |
| 4 | 31.3 | 68.7 | 96.1 |

The results indicate that a portion of the cellulose is being solubilized as the reactor time increases and probably accounts for the increase in EtOH precipitatable solids. The particulate and soluble fractions are easily recovered separately by mechanical dewatering on a continuous belt press. The PCC cake may be used as recovered or resuspended, bleached and classified as described for the acid converted product.

EXAMPLE 9: PREPARATION OF PCC FROM CITRUS PULP

PCC and related materials may also be obtained from other vegetable material in addition to sugar beets. Thus citrus pulps, Jerusalem artichoke pulps, and many other processed plant residues containing a high proportion of parenchymous matter may serve as sources of PCC. Most also comprise useful hemicellulose fractions as well. An especially promising source of PCC is citrus. It appears that PCC derived from citrus may also be useful in the preparation of drilling completion and workover fluids for oil and gas production.

Fifty pounds of a commercial feed grade, pelletized grapefruit pulp was hydrated at 10% w/w pulp solids. Sufficient 50% w/w NaOH was added to make the slurry 0.1 N NaOH with an initial pH of 12.1. The viscous slurry was passed through the tubular reactor assembly described above at 165° C. The slurry was pumped at an appropriate rate to give a fifty second residence time. The superficial linear velocity across the exit orifice was approximately 1000 cm/second. The product was cooled and the distribution of nonvolatile solids obtained by partitioning and rinsing through a 200 mesh nylon cloth was 38% retained particulates and 62% soluble/colloidal, respectively.

The pH of the press juice was adjusted to 4.5 with HCl and two commercial pectinases, Klerzyme TM L-100 and Pectinol TM 60B, added to the hazy, brown colored solution at 1% v/v each. After several hours of incubation, the solution was centrifuged and analyzed by HPLC as in Example 6. Minor and approximately equal molar quantities of D-glucose and D-fructose were found in the supernatent, but no D-galacturonic acid. The glucose and fructose probably arise from hydrolysis of endogeneous sucrose. The pectates appear to be flocculated, colloidal precipitates which result from lime treatment of the pulp prior to drying. Any low molecular weight uronic acids generated during the hydrolytic enzyme treatment are probabyy co-flocculated and also sedimented during centrifugation. Useful hemicelluloses, in soluble form, are not easily isolated from citrus pulp which has been treated with lime.

The alkaline converted pulp residue was rinsed and classified by jet spraying against a 100 mesh screen onto a collector 200 mesh screen. In contrast to PCC obtained from sugar beets, which almost totally passes a 100 mesh screen, the particulate dimensions of grapefruit pulp derived PCC are somewhat larger, with 76% being retained on a 100 mesh screen and 24% recovered from the 200 mesh collector screen. The recovered PCC is easily bleached to a white cellulose pulp using conditions similar to those decribed in Examples 2-4. The bleached and classified PCC from citrus appears very similar to that from beet pulp regarding the rheology of a low solids homogenate and its film forming characteristics. Light microscopy indicates significantly more heterogeneity of membrane size than observed for beet PCC, however.

EXAMPLE 10: RELATIVE TEMPERATURE TOLERANCE OF PCC OBTAINED FROM BEET AND CITRUS PULP.

Bleached and classified samples of PCC prepared according to Examples 2-5 and foregoing Example 9 from beet and citrus pulps, respectively, were suspended in water and homogenized at high speed in a Waring blender for 15 minutes. The citrus homogenate was 1.5% w/v particulate PCC and the beet homogenate was 0.8% w/v particulate PCC, both uncorrected for inorganic ash content. The pH was adjusted to 9.0 for the beet PCC samples and to 10.0 for the citrus pulp homogenates. The homogenates were placed in high temperature/high pressure stainless steel incubation cells and degassed in situ by repetitive vacuum aspiration and nitrogen flushing. The cells were pressurized to 100 psi with nitrogen and sealed and subjected to static incubation at the indicated temperature for 16 huurs. After incubation, the contents of the cell were cooled and examined. Standard A.P.I. rheology profiles were obtained with a Fann viscometer Model 35. The results are shown in the following table. Ten minute gel strengths are identical to the 10 second gel strengths.

The homogenates are progressively degraded as the temperature increases beyond 160° C. Both PCC preparations behave similarly in that they are highly stable to temperatures up to approximately about 160° C. and then appear to undergo an irreversible thermal transformation between 160° C. and 190° C., losing 50 to 70% of their viscosity in 16 hours as measured at 600 rpm in the Fann viscometer.

| Comparative Thermal Stability of PCC From Beet and Citrus Pulp | | | | | | | | |
|---|---|---|---|---|---|---|---|---|
| | CITRUS PULP PCC | | | | BEET PULP PCC | | | |
| RHEOLOGY PROFILE | 20° C. | 92° C. | 162° C. | 195° C. | 20° C. | 136° C. | 162° C. | 192° C. |
| Fann 600 rpm viscosity, cps | 30.5 | 28.0 | 28.5 | 9.5 | 19.0 | 19.5 | 18.0 | 8.5 |
| Fann 300 rpm viscosity, cps | 41.0 | 39.0 | 38.0 | 12.0 | 25.0 | 27.0 | 26.0 | 10.0 |

-continued

| | Comparative Thermal Stability of PCC From Beet and Citrus Pulp | | | | | | | |
|---|---|---|---|---|---|---|---|---|
| | CITRUS PULP PCC | | | | BEET PULP PCC | | | |
| RHEOLOGY PROFILE | 20° C. | 92° C. | 162° C. | 195° C. | 20° C. | 136° C. | 162° C. | 192° C. |
| PV, cps | 20.0 | 17.0 | 19.0 | 7.0 | 13.0 | 12.0 | 20.0 | 7.0 |
| YP, lb./100 ft$^2$ | 21.0 | 22.0 | 19.0 | 5.0 | 12.0 | 15.0 | 16.0 | 3.0 |
| 10 sec. gel, lb./100 ft$^2$ | 12.0 | 12.5 | 9.0 | 3.0 | 10.0 | 9.0 | 8.5 | 2.5 |
| Final pH | 10.0 | 8.3 | 6.8 | 5.0 | 9.0 | 7.1 | 6.8 | 4.1 |

EXAMPLE 11: "MILD" ACID ISOLATION OF PCC FROM CITRUS PULP

Kiln dried lemon-lime pulp which had not been subjected to alkaline treatment with caustic lime was ground in a Comitrol TM unit to under 20 mesh and suspended in water at approximately 4.5% solids "as is" for about 30 minutes. The pH of the hydrated slurry was mildly acidic at 3.9; after addition of 11 ml concentrated HCl per gallon the pH dropped to 2.2. The acidic citrus pulp slurry was then subjected to thermomechanical treatment in the tubular reactor assembly described in Example 1. The reaction temperature was about 165° C. with an average reactor residence time of about 170 seconds. The reacted puree was cooled to room temperature and the measured pH was 2.3.

Mechanical pressing easily separated the puree into a press cake of approximately 15% solids and a low viscosity press juice. The total nonvolatile solids in the reacted puree were 5.5%, of which 4% were soluble or colloidal substances (hemicelluloses, HC) not retained by a 200 mesh nylon screen and 1.5% retained cellulosic particulates, PCC. The ash component of both the PCC and HC fractions was relatively low at 0.9% and 4.8%, respectively. Liquid chromatographicc analysis of the enzyme hydrolysate of the HC fraction indicates the gross composition to be 1.4% w/v pectin, 1.2% w/v arabinogalactans (predominantly composed of arabinose and galactose) 0.8% of nondegraded polymers and/or salts, and 0.6% other carbohydrates including glucose. In general the gross compositional carbohydrate profile of HC from citrus pulp after enzyme hydrolysis is similar to that obtained from beet pulp.

The particulate PCC fraction was bleached and classified according to foregoing Examples 2 and 3 to give a grey-white, bleached-classified PCC, PCC-BC. The product is easily dispersed by mechanical means to give a low solids homogenate with properties similar to that derived from beet pulp. Examination with the light microscope indicates a substantially broader size distribution of membrane structures to be present than that observed for PCC from beet pulp.

The HC fluid was adjusted to pH 4.5 whereupon proteinaceous substances precipitated. The press juice was then filtered and concentrated to 30 to 40% solids. As in the case of beet pulp HC, citrus pulp HC concentrates yield low viscosity, pourable liquids at high solids. After alkaline saponification, a 5% w/v solids citrus HC forms a viscous gel-like substance upon lowering the pH below 7.

What is claimed:

1. A process for the production of cellulose comprising:
    selecting plant material comprising a major proportion of parenchymal cells;
    suspending said plant material in an aqueous medium;
    adjusting the pH of said suspension to a value less than about 4.5;
    heating said suspension to a temperature greater than about 125° C.;
    maintaining said suspension at a temperature greater than about 125° C. for from about 15 to about 260 seconds;
    subjecting said heated suspension to mechanical shearing; and
    isolating parenchymal cell cellulose from said suspension.

2. The process of claim 1 wherein said mechanical shearing is accomplished by passing the heated suspension from a first region having a first pressure into a second region having a lower pressure.

3. The process of claim 2 wherein said passing is through at least one orifice.

4. The process of claim 1 wherein said plant material is a residual product of carbohydrate extraction.

5. The process of claim 1 wherein said plant material is a residual product of plant juice extraction.

6. The process of claim 1 wherein said plant material is sugar beet or citrus pulp.

7. The process of claim 1 wherein said pH is from about 4.0 to about 2.0.

8. The process of claim 1 wherein said temperature is from about 140° C. to about 200° C. and said time is from about 30 to about 200 seconds.

9. Cellulose prepared in accordance with claim 1.

10. A process for the production of biological polymeric materials comprising:
    selecting plant material comprising a major proportion of parenchymal cells, said plant material comprising hemicellulose and cellulose;
    suspending said plant material in an aqueous medium;
    adjusting the pH of said suspension to a value less than about 4.5;
    heating said suspension to a temperature greater than about 125° C.;
    maintaining said suspension at a temperature greater than about 125° C. for from about 15 to about 360 seconds;
    subjecting said heated suspension to mechanical shearing to form a gruel having solid and liquid components;
    separating said solid and liquid components; and recovering from said liquid component a material comprising at least a portion of said hemicellulose.

11. The process of claim 10 wherein a major proportion of substances other than said cellulose and hemicellulose have been removed from said plant material prior to said suspending step.

12. The process of claim 10 wherein said pH is from about 4.0 to about 2.0.

13. The process of claim 10 wherein said temperature is from about 140° C. to about 200° C. and said time is from about 30 to about 200 seconds.

14. The process of claim 10 wherein said mechanical shearing is accomplished by passing the suspension from a first region having a first pressure into a second region having a lower pressure.

15. The process of claim 14 wherein said passing is through at least one orifice.

16. The process of claim 10 further comprising the step of isolating at least a portion of said cellulose from said solid component.

17. Cellulose prepared in accordance with claim 16.

18. The process of claim 10 wherein said recovering comprises adjusting the pH of said liquid component to a value greater than about 4.5.

19. The process of claim 10 wherein said plant material is a residual product of carbohydrate extraction.

20. The process of claim 10 wherein said plant material is a residual product of plant juice extraction.

21. The process of claim 10 wherein said plant material is sugar beet or citrus pulp.

22. The process of claim 10 further comprising removing water fom said liquid component to produce a gum.

23. The gum produced in accordance with claim 22.

24. Hemicellulose prepared in accordance with claim 10.

25. A process for the preparation of biological polymeric materials comprising:
   selecting plant material comprising a major proportion of parenchymal cells, said plant material comprising cellulose and hemicellulose;
   suspending said plant material in an aqueous medium;
   adjusting the pH of said suspension to a value less than about 4.5;
   heating said suspension to a temperature greater than about 125° C.;
   maintaining said suspension at a temperature greater than 125° C. for a period of time;
   subjecting said heated suspension to a degree of mechanical shearing sufficient to form a gruel having solid and liquid components, said temperature, time and degree of mechanical shearing being selected substantially to disassociate said hemicellulose from said cellulose without causing substantial degradation of said hemicellulose;
   separating said solid and liquid components; and
   recovering from said liquid component a material comprising at least a portion of said hemicellulose.

26. The process of claim 25 wherein a major proportion of substances other than said cellulose and hemicellulose have been removed from said plant material prior to said suspending step.

27. The process of claim 25 wherein said pH is from about 4.0 to about 2.0.

28. The process of claim 25 wherein said temperature is from about 140° C. to about 200° C. and said time is from about 30 to about 200 seconds.

29. The process of claim 25 wherein said mechanical shearing is accomplished by passing the suspension from the first region having a first pressure into a second region having a lower pressure.

30. The process of claim 29 wherein said passing is through at least one orifice.

31. The process of claim 25 further comprising the step of isolating at least a portion of said cellulose from said solid component.

32. Cellulose prepared in accordance with claim 31.

33. The process of claim 25 wherein said recovering comprises adjusting the pH of said liquid component to a value greater than about 4.5.

34. The process of claim 25 wherein said plant material is a residual product of carbohydrate extraction.

35. The process of claim 25 wherein said plant material is a residual product of plant juice extraction.

36. The process of claim 25 wherein said plant material is sugar beet or citrus pulp.

37. The process of claim 25 further comprising removing water from said liquid component to produce a gum.

38. The gum produced in accordance with claim 37.

39. Hemicellulose prepared in accordance with claim 25.

40. A process for the production of cellulose comprising:
   selecting plant material comprising a major proportion of parenchymal cells;
   suspending said plant material in an aqueous medium;
   adjusting the pH of said suspension to a value greater than about 10.0;
   heating said suspension to a temperature greater than about 125° C.;
   maintaining said suspension at a temperature greater than about 125° C. for from about 15 to about 360 seconds;
   subjecting said heated suspension to mechanical shearing; and
   isolating parenchymal cell cellulose from said suspension.

41. The process of claim 40 wherein said mechanical shearing is accomplished by passing the heated suspension from a first region having a first pressure into a second region having a lower pressure.

42. The process of claim 41 wherein said passing is through at least one orifice.

43. The process of claim 40 wherein said plant material is a residual product of carbohydrate extraction.

44. The process of claim 40 wherein said plant material is a residual product of plant juice extraction.

45. The process of claim 40 wherein said plant material is sugar beet or citrus pulp.

46. The process of claim 40 wherein said pH is from about 10.5 to about 13.0.

47. The process of claim 40 wherein said temperature is from about 140° C. to about 200° C. and said time is from about 30 to about 200 seconds.

48. Cellulose prepared in accordance with claim 40.

49. A process for the production of biological polymeric materials comprising:
   selecting plant material comprising a major proportion of parenchymal cells, said plant material comprising hemicellulose and cellulose;
   suspending said plant material in an aqueous medium;
   adjusting the pH of said suspension to a value greater than about 10.0;
   heating said suspension to a temperature greater than about 125° C.;
   maintaining said suspension at a temperature greater than about 125° C. for from about 15 to about 360 seconds;
   subjecting said heated suspension to mechanical shearing to form a gruel having solid and liquid components;
   separating said solid and liquid components; and recovering from said liquid component a material comprising at least a portion of said hemicellulose.

50. The process of claim 49 wherein a major proportion of substances other than said cellulose and hemicellulose have been removed from said plant material prior to said suspending step.

51. The process of claim 49 wherein said pH is from about 10.5 to about 13.0.

52. The process of claim 49 wherein said temperature is from about 140° C. to about 200° C. and said time is from about 30 to about 60 seconds.

53. The process of claim 49 wherein said mechanical shearing is accomplished by passing the suspension from a first region having a first pressure into a second region having a lower pressure.

54. The process of claim 53 wherein said passing is through at least one orifice.

55. The process of claim 49 further comprising the step of isolating at least a portion of said cellulose from said solid component.

56. Cellulose prepared in accordance with claim 55.

57. The process of claim 49 wherein said recovering comprises adjusting the pH of said liquid component to a value less than about 10.0.

58. The process of claim 49 wherein said plant material is a residual product of carbohydrate extraction.

59. The process of claim 49 wherein said plant material is a residual product of plant juice extraction.

60. The process of claim 49 wherein said plant material is sugar beet or citrus pulp.

61. The process of claim 49 further comprising removing water from said liquid component to produce a gum.

62. The gum produced in accordance with claim 60.

63. Hemicellulose prepared in accordance with claim 49.

64. A process for the preparation of biological polymeric materials comprising:
selecting plant material comprising a major proportion of parenchymal cells, said plant material comprising sugar, starch, cellulose and hemicellulose;
suspending said plant material in an aqueous medium;
adjusting the pH of said suspension to a value greater than about 10.0;
heating said suspension to a temperature greater than about 125° C.;
maintaining said suspension at a temperature greater than 125° C. for a period of time;
subjecting said heated suspension to a degree of mechanical shearing sufficient to form a gruel having solid and liquid components, said temperature, time and degree of mechanical shearing being selected substantially to disassociate said hemicellulose from said cellulose without causing substantial degradation of said hemicellulose;
separating said solid and liquid components; and
recovering from said liquid component a material comprising at least a portion of said hemicellulose.

65. The process of claim 64 wherein a major proportion of substances other than said cellulose and hemicellulose have been removed from said plant material prior to said suspending step.

66. The process of claim 64 wherein said pH is from about 10.5 to about 13.0.

67. The process of claim 64 wherein said temperature is from about 140° C. to about 200° C. and said time is from about 30 to about 200 seconds.

68. The process of claim 64 wherein said mechanical shearing is accomplished by passing the suspension from the first region having a first pressure into a second region having a lower pressure.

69. The process of claim 64 wherein said passing is through at least one orifice.

70. The process of claim 64 further comprising the step of isolating at least a portion of said cellulose from said solid component.

71. Cellulose prepared in accordance with claim 70.

72. The process of claim 64 wherein said recovering comprises adjusting the pH of said liquid component to a value less than about 10.0.

73. The process of claim 64 wherein said plant material is a residual product of carbohydrate extraction.

74. The process of claim 64 wherein said plant material is a residual product of plant juice extraction.

75. The process of claim 64 wherein said plant material is sugar beet or citrus pulp.

76. The process of claim 64 further comprising removing water from said liquid component to produce a gum.

77. The gum produced in accordance with claim 75.

78. Hemicellulose prepared in accordance with claim 64.

79. Parenchymal cell cellulose having less than about 5% by weight of hemicellulose associated therewith.

80. The parenchymal cell cellulose of claim 79 having substantially no hemicellulose associated therewith.

81. Parenchymal cell cellulose of claim 80 dispersed in an aqueous medium.

82. The parenchymal cell cellulose of claim 79 or 80 having less than about 5% of non-parenchymal cell cellulose associated therewith.

83. The dispersion of claim 81 wherein parenchymal cell cellulose is present from about 0.5% to about 5% by weight.

84. Cellulose in the form of platelets, said parenchymal cell cellulose having substantially no hemicellulose associated therewith.

85. Cellulose in the form of platelets, said parenchymal cell cellulose having less than about 5% by weight of hemicellulose associated therewith.

86. The cellulose of claim 84 wherein said platelets are of native cellular dimension.

87. The cellulose of claim 84 having less than about 5% of non-parenchymal cell cellulose associated therewith.

88. The cellulose of claim 85 wherein said platelets are of native cellular dimension.

89. The cellulose of claim 85 having less than about 5% of non-parenchymal cell cellulose associated therewith.

* * * * *